United States Patent
Horn

(10) Patent No.: US 11,558,146 B2
(45) Date of Patent: Jan. 17, 2023

(54) SIGNAL ANALYSIS APPARATUS AND METHOD FOR ANALYZING A SYMBOL SEQUENCE

(71) Applicant: Rohde & Schwarz GmbH & Co. KG, Munich (DE)

(72) Inventor: Armin Horn, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 17/075,403

(22) Filed: Oct. 20, 2020

(65) Prior Publication Data
US 2022/0123859 A1   Apr. 21, 2022

(51) Int. Cl.
*H04L 1/00* (2006.01)
*H04L 27/06* (2006.01)
*H04L 1/08* (2006.01)

(52) U.S. Cl.
CPC .......... *H04L 1/0052* (2013.01); *H04L 1/0057* (2013.01); *H04L 27/06* (2013.01)

(58) Field of Classification Search
CPC ...... H04L 1/0052; H04L 1/0057; H04L 27/06
See application file for complete search history.

(56) References Cited

U.S. PATENT DOCUMENTS

| | | | |
|---|---|---|---|
| 9,819,444 B2* | 11/2017 | Shen | H04L 1/0041 |
| 9,979,507 B1* | 5/2018 | Lo | H04L 7/04 |
| 10,148,467 B2* | 12/2018 | Pandey | H04L 25/028 |
| 2021/0273745 A1* | 9/2021 | Tsuyuki | H04B 17/00 |

FOREIGN PATENT DOCUMENTS

WO   2014/032711 A1   3/2014

* cited by examiner

*Primary Examiner* — Justin R Knapp
(74) *Attorney, Agent, or Firm* — Christensen O'Connor Johnson Kindness PLLC

(57) ABSTRACT

A signal analysis apparatus for analyzing an input signal is described. The input signal includes a symbol sequence. The symbol sequence includes data information and redundant data information. The signal analysis apparatus includes one or more circuits composed of a decoder module, an error correction module, and a processing module. The decoder module is configured to decode the input signal, thereby obtaining a decoded input signal. The error correction module is configured to identify at least one error in the decoded input signal. The processing module is configured to generate a data set. The data set includes information on the at least one identified error. The data set further includes information on at least one of a portion of the input signal being associated with the error and a portion of the decoded input signal being associated with the error. Further, a signal analysis device and a signal analysis method are described.

16 Claims, 4 Drawing Sheets

SIGNAL ANALYSIS APPARATUS AND METHOD FOR ANALYZING A SYMBOL SEQUENCE

FIELD OF THE DISCLOSURE

Embodiments of the present disclosure generally relate to a signal analysis module for analyzing an input signal. Embodiments of the present disclosure further relate to a signal analysis device as well as to a signal analysis method for analyzing an input signal comprising a symbol sequence.

BACKGROUND

In the state of the art, it is known to analyze pulse modulated signals by a signal analyzing instrument like an oscilloscope. For instance, the respective pulse modulated signals correspond to pulse width modulated (PWM) signals, pulse density modulated (PDM) signals, or pulse amplitude modulated (PAM) signals.

In a typical use scenario, such pulse modulated signals comprise a symbol sequence that has to be decoded by a receiver of the pulse modulated signal. One important mechanism in some wired and wireless communication protocols is a so-called error correction, which is performed by the receiver of the symbol sequence. In general, error correction techniques are used in order to keep a symbol error rate or a packet error rate as low as possible, thereby enhancing the reliability of the data transmission.

While error correction methods known in the state of the art allow to reduce the symbol error rate (and thus the packet error rate), these error correction methods do not reveal the underlying problem, i.e. why a certain symbol is received faulty in the first place.

Accordingly, there is a need for a signal analysis method and a signal analysis module that allow for identifying the error source of a faulty data transmission.

SUMMARY

Embodiments of the present disclosure provide a signal analysis apparatus for analyzing an input signal, wherein the input signal comprises a symbol sequence. The symbol sequence comprises data information and redundant data information. In an embodiment, the signal analysis apparatus comprises a decoder circuit or module, an error correction circuit or module, and a processing circuit or module. The decoder module is configured to decode the input signal, thereby obtaining a decoded input signal. The error correction module is configured to identify at least one error in the decoded input signal. The processing module is configured to generate a data set. The data set comprises information on the at least one identified error. The data set further comprises information on at least one of a portion of the input signal being associated with the error and a portion of the decoded input signal being associated with the error.

Thus, the signal analysis apparatus according to the present disclosure provides two types of information, namely the information on the error itself and also information on the particular portion of the input signal or of the decoded input signal being associated with the error. Accordingly, the particular error source can be identified based on the information on the at least one identified error and based on the information on at least one of the portion of the input signal being associated with the error and the portion of the decoded input signal being associated with the error.

Thus, a specific fault being responsible for that particular error may be identified in a transmission path extending from a signal source generating the input signal to the signal analysis module.

In other words, the signal analysis apparatus according to the present disclosure provides information on the particular source of an error rather than only correcting the error itself. Thus, signal analysis apparatus according to the present disclosure provides information on the at least one error that can be used for debugging the transmission path of the input signal.

For example, the information on at least one of the portion of the input signal being associated with the error and the portion of the decoded input signal being associated with the error may relate to whether the error occurred in a header portion of the symbol sequence or in a payload portion of the symbol sequence.

According to an aspect of the present disclosure, the information on the at least one identified error comprises at least one of the type of the at least one error or the number of errors. For example, the type of the at least one error may relate to whether a symbol has been received with a false symbol value or whether the corresponding symbol has not been received at all. Alternatively or additionally, the type of the at least one error may relate to whether the error is significant, i.e. whether the error could prevent a correct restoration of the information comprised in the symbol sequence. In other words, the type of the at least one error may be associated with the severity of the individual errors. The number of errors constitutes a measure for how likely a certain error is, and thus constitutes a measure for the reliability of the data transmission.

For example, if a certain error occurs particularly often, a certain portion of the transmission path may be likely to be the source of the error.

In a further embodiment of the present disclosure, the error correction module is configured to correct the at least one identified error based on the redundant data information, thereby obtaining a corrected decoded input signal. In other words, the error correction module is configured to perform a forward error correction (FEC) of the symbol sequence based on the redundant data information. This way, erroneous data information can be restored without requesting the signal source generating the input signal to transmit the respective data information once again.

According to another aspect of the present disclosure, the data set comprises information on a portion of the corrected decoded input signal being associated with the error. In some embodiments, the data set may comprise a comparison of the portion of the corrected decoded input signal being associated with the error with the corresponding portion of the decoded input signal being associated with the error. In some embodiments, the data set comprises a comparison of at least one faulty symbol with the corresponding corrected symbol.

In an embodiment of the present disclosure, the decoder module is established as a Reed Solomon decoder. In other words, the decoder module and the error correction module may be configured to perform a Reed Solomon error correction, which is a particularly reliably form of forward error correction.

According to a further aspect of the present disclosure, the processing module is configured to generate visualization data based on the data set. In other words, the information on the at least one error, for example the error type and the number of errors, the information on the portion of the input signal being associated with the at least one error, the information on the portion of the decoded input signal being associated with the at least one error and/or the information on the portion of the corrected decoded input signal being associated with the at least one error may be converted into a graphical representation of this information.

In some embodiments, the visualization data is visualized on a display being connected to the signal analysis apparatus, more precisely to the processing module. This way, all information necessary for debugging the transmission path is accessible to a user of the signal analysis module in a particularly convenient way.

In some embodiments, the visualization data comprises at least one of a data label being associated with the decoded input signal and an error label being associated with the at least one identified error. In other words, portions of the input signal or rather of the decoded input signal that have been received may be marked with a corresponding data label, for example with a certain color and/or with a certain text. Similarly, portions of the input signal or rather of the decoded input signal that have been received correctly may be marked with a corresponding data label, for example with a certain color and/or with a certain text. Likewise, portions of the input signal or rather of the decoded input signal that comprise an error may be marked with a corresponding error label, for example with a certain color and/or with a certain text.

In a further embodiment of the present disclosure, the visualization data comprises a table, wherein individual cells of the table comprise information being associated with the data set. For example, the individual cells may comprise information on a number of the respective symbol, whether the respective symbol comprises an error, the time at which the respective symbol has been received, a duration of the respective symbol, a start time of the respective symbol, a stop time of the respective symbol, a destination address of the respective symbol, a symbol value of the respective symbol, a corrected symbol value of the respective symbol, and/or a checksum being associated with the respective symbol.

The input signal may be established as a pulse amplitude modulated (PAM)-N signal, wherein N is an integer bigger than 1. For example, the input signal may be established as a PAM-3 signal. Accordingly, the signal analysis module described above may be used, e.g., for Gigabit Ethernet applications, for example according to the 1000Base-T1 standard.

Embodiments of the present disclosure further provide a signal analysis device, comprising a display and a signal analysis apparatus, such as any of the apparatus described above.

In some embodiments, the signal analysis device may comprise a signal analysis apparatus according to any of the embodiments described above.

For example, the signal analysis device may be established as a measurement instrument. In some embodiments, the signal analysis may be established as an oscilloscope, as a signal analyzer or as a vector network analyzer.

Regarding the advantages and further properties of the signal analysis device, reference is made to the explanations given above with respect to the signal analysis apparatus, which also hold for the signal analysis device and vice versa.

Embodiments of the present disclosure further provide a signal analysis method for analyzing an input signal comprising a symbol sequence. The symbol sequence comprises data information and redundant data information. In an embodiment, the signal analysis method comprises the following steps:

receiving the input signal;
decoding the input signal by a decoder circuit or module, thereby obtaining a decoded input signal;
identifying at least one error in the decoded input signal by an error correction circuit or module; and
generating a data set by a processing circuit or module, the data set comprising information on the at least one identified error and information on at least one of a portion of the input signal being associated with the error and a portion of the decoded input signal being associated with the error.

In some embodiments, the signal analysis apparatus described above is configured to perform the signal analysis method.

Regarding the advantages and further properties of the signal analysis method, reference is made to the explanations given above with respect to the signal analysis apparatus, which also hold for the signal analysis method and vice versa.

In an embodiment of the present disclosure, the information on the at least one identified error comprises at least one of the type of the at least one error or the number of errors. For example, the type of the at least one error may relate to whether a symbol has been received with a false symbol value or whether the corresponding symbol has not been received at all. Alternatively or additionally, the type of the at least one error may relate to whether the error is significant, i.e. whether the error could prevent a correct restoration of the information comprised in the symbol sequence. In other words, the type of the at least one error may be associated with the severity of the individual errors. The number of errors constitutes a measure for how likely a certain error is, and thus constitutes a measure for the reliability of the data transmission.

For example, if a certain error occurs particularly often, a certain portion of the transmission path may be likely to be the source of the error.

According to an aspect of the present disclosure the at least one identified error is corrected based on the redundant data information, thereby obtaining a corrected decoded input signal. In other words, a forward error correction (FEC) of the symbol sequence is performed based on the redundant data information. This way, erroneous data information can be restored without requesting the signal source generating the input signal to transmit the respective data information once again.

In a further embodiment of the present disclosure, the data set comprises information on a portion of the corrected decoded input signal being associated with the error. In some embodiments, the data set may comprise a comparison of the portion of the corrected decoded input signal being associated with the error with the corresponding portion of the decoded input signal being associated with the error. In some embodiments, the data set comprises a comparison of at least one faulty symbol with the corresponding corrected symbol.

According to another aspect of the present disclosure, the at least one error is corrected based on a Reed Solomon error correction. In other words, a Reed Solomon error correction of the symbol sequence is performed, which is a particularly reliably form of forward error correction.

In some embodiments, visualization data is generated based on the data set, wherein the visualization data is visualized on a display. In other words, the information on the at least one error, for example the error type and the number of errors, the information on the portion of the input signal being associated with the at least one error, the information on the portion of the decoded input signal being associated with the at least one error and/or the information on the portion of the corrected decoded input signal being associated with the at least one error may be converted into a graphical representation of this information. The graphical representation may be displayed on the display. Thus, all information necessary for debugging the transmission path is accessible to a user in a particularly convenient way.

The visualization data may comprise at least one of a data label being associated with the decoded input signal or an error label being associated with the at least one identified error. In other words, portions of the input signal or rather of the decoded input signal that have been received may be marked with a corresponding data label, for example with a certain color and/or with a certain text. Similarly, portions of the input signal or rather of the decoded input signal that have been received correctly may be marked with a corresponding data label, for example with a certain color and/or with a certain text. Likewise, portions of the input signal or rather of the decoded input signal that comprise an error may be marked with a corresponding error label, for example with a certain color and/or with a certain text.

According to another aspect of the present disclosure, the visualization data comprises a table, wherein individual cells of the table comprise information being associated with the data set. For example, the individual cells may comprise information on a number of the respective symbol, whether the respective symbol comprises an error, the time at which the respective symbol has been received, a duration of the respective symbol, a start time of the respective symbol, a stop time of the respective symbol, a destination address of the respective symbol, a symbol value of the respective symbol, a corrected symbol value of the respective symbol, and/or a checksum being related to the respective symbol.

In a further embodiment of the present disclosure, the input signal is established as a pulse amplitude modulated (PAM)-N signal, wherein N is an integer bigger than 1. For example, the input signal may be established as a PAM-3 signal. Accordingly, the signal analysis method described above may be used, e.g., for Gigabit Ethernet applications, for example according to the 1000Base-T1 standard.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
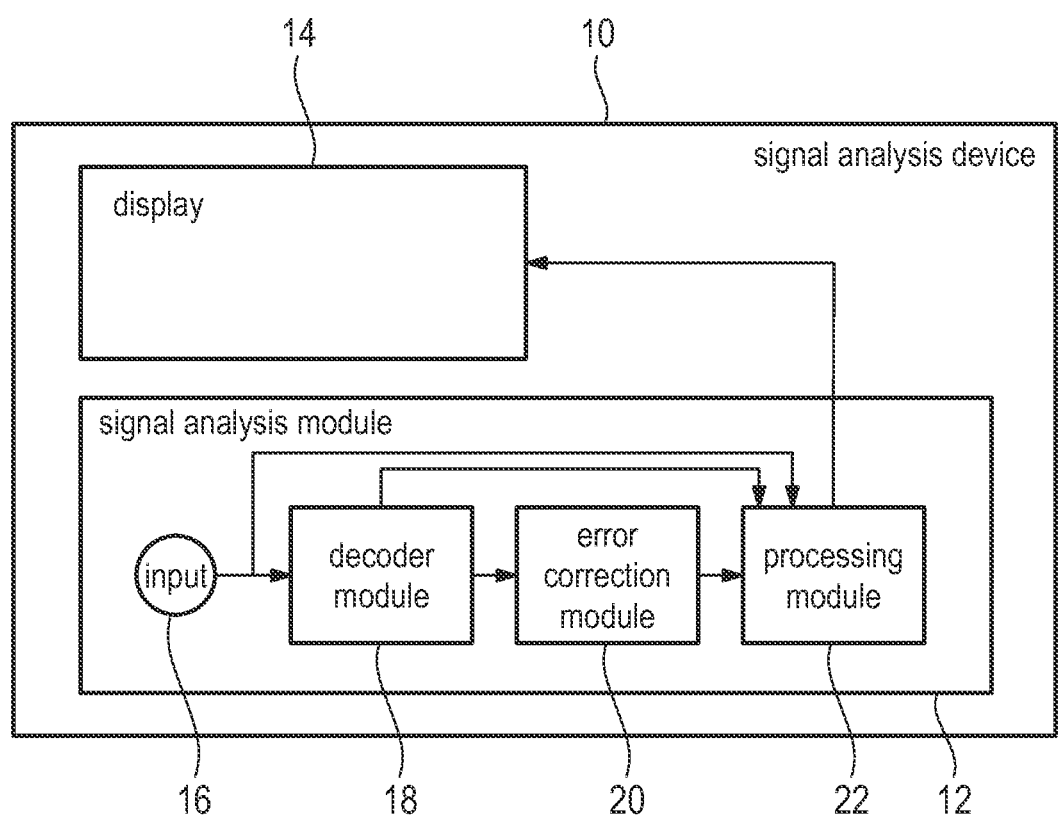
FIG. 1 schematically shows a signal analysis device according to an embodiment of the present disclosure.

FIG. 1 schematically shows a signal analysis device 10 comprising a signal analysis apparatus or module 12 and a display 14.

As used herein, the term "module" refers to a combination of suitable hardware (e.g. a processor such as an integrated circuit or other circuitry) and suitable software (e.g. machine- or processor-executable instructions, commands, or code such as firmware, programming, or object code) or a combination of hardware and software that is configured to have a certain functionality. Furthermore, a combination of hardware and software may include hardware only (i.e. a hardware element with no software elements), software hosted at hardware (e.g. software that is stored at a memory and executed or interpreted at a processor), or hardware with the software hosted thereon. The hardware may, inter alia, comprise a CPU, a GPU, an FPGA, an ASIC, or other types of electronic circuitry.

In general, the signal analysis device 10 may be established as any type of measurement instrument being configured to analyze an input signal comprising a symbol sequence. In some embodiments, the signal analysis device 10 may be established as an oscilloscope, as a signal analyzer, or as a vector network analyzer.

In the embodiment shown, the signal analysis circuit or module 12 comprises an input 16, a decoder circuit or module 18, an error correction circuit or module 20, and a processing circuit or module 22.

Generally speaking, the signal analysis module 12 is configured to analyze an input signal received via the input 16. More precisely, the signal analysis module 12 is configured to perform a signal analysis method for analyzing an input signal comprising a symbol sequence. One example of the signal analysis method is described in the following with reference to FIG. 2.

An input signal comprising a symbol sequence is received by the input 16 (step S1). The input signal or rather the symbol sequence comprises data information as well as redundant data information. In other words, the symbol sequence comprises more data information than necessary, namely the redundant data information. The redundant data information can be used to correct errors on the receiver side, which will be described in more detail below.

The input signal may be generated by a device under test or by any other signal source. For example, the input signal is generated by the device under test and transmitted to the signal analysis device 10 via a wire-based connection or via a wireless connection.

In some embodiments, the input signal is established as a pulse amplitude modulated (PAM)-N signal, wherein N is an integer bigger than 1. For example, the input signal is established as a PAM-3 signal.

The input signal may be established as a digital signal. If the input signal is established as an analog signal, the input signal may be digitized by an analog-to-digital converter, and the steps described in the following may be performed based on the digitized input signal.

The input signal is decoded by the decoder module 18, thereby obtaining a decoded input signal (step S2). In other words, the symbol values of the individual symbols of the symbol sequence are determined by the decoder module 18.

In step S2, any signal decoder method known from the state of the art may be employed. For example, a clock data recovery may be performed first, and the signal may be decoded based on a clock signal recovered via the clock data recovery. The decoded input signal is forwarded to the error correction module 20.

The error correction module 20 performs a forward error correction on the symbol sequence comprised in the input signal based on the redundant data information, thereby obtaining a corrected decoded input signal (step S3). More precisely, the error correction module performs a Reed Solomon error correction on the symbol sequence based on the redundant data information. In other words, the error correction module 20 identifies one or several errors in the received input signal or rather the in the decoded input signal, for example by a checksum, and corrects the error(s) based on the redundant data information. The corrected decoded input signal, the decoded input signal, and/or the input signal is forwarded to the processing module 22.

The processing module 22 generates a data set based on the corrected decoded input signal, based on the decoded input signal and/or based on the input signal (step S4). In general, the data set comprises information on the at least one identified error. More precisely, the data set comprises information on the type of the individual error(s) and on the total number of errors.

For example, the type of the individual errors may relate to whether a symbol has been received with a false symbol value or whether the corresponding symbol has not been received at all. Alternatively or additionally, the type of the individual errors may relate to whether the respective error is significant, i.e. whether the respective error could prevent a correct restoration of the information comprised in the symbol sequence. In other words, the type of the at least one error may be associated with the severity of the individual errors.

The number of errors constitutes a measure for how likely a certain error is, and thus constitutes a measure for the reliability of the data transmission.

The data set further comprises information on a portion of the input signal being associated with the error(s), a portion of the decoded input signal being associated with the error(s), and/or on a portion of the corrected decoded input signal being associated with the error(s).

Thus, the data set comprises two different types of information, namely information on the error itself and information on the location of the respective error in the signal.

The processing module 22 generates visualization data based on the data set (step S5). In general, the visualization data corresponds to a graphical representation of the information comprised in the data set. Thus, the visualization data corresponds to a graphical representation of the information on the at least one error, for example the error type and the number of errors, the information on the portion of the input signal being associated with the at least one error, the information on the portion of the decoded input signal being associated with the at least one error and/or the information on the portion of the corrected decoded input signal being associated with the at least one error.

Figure 3:
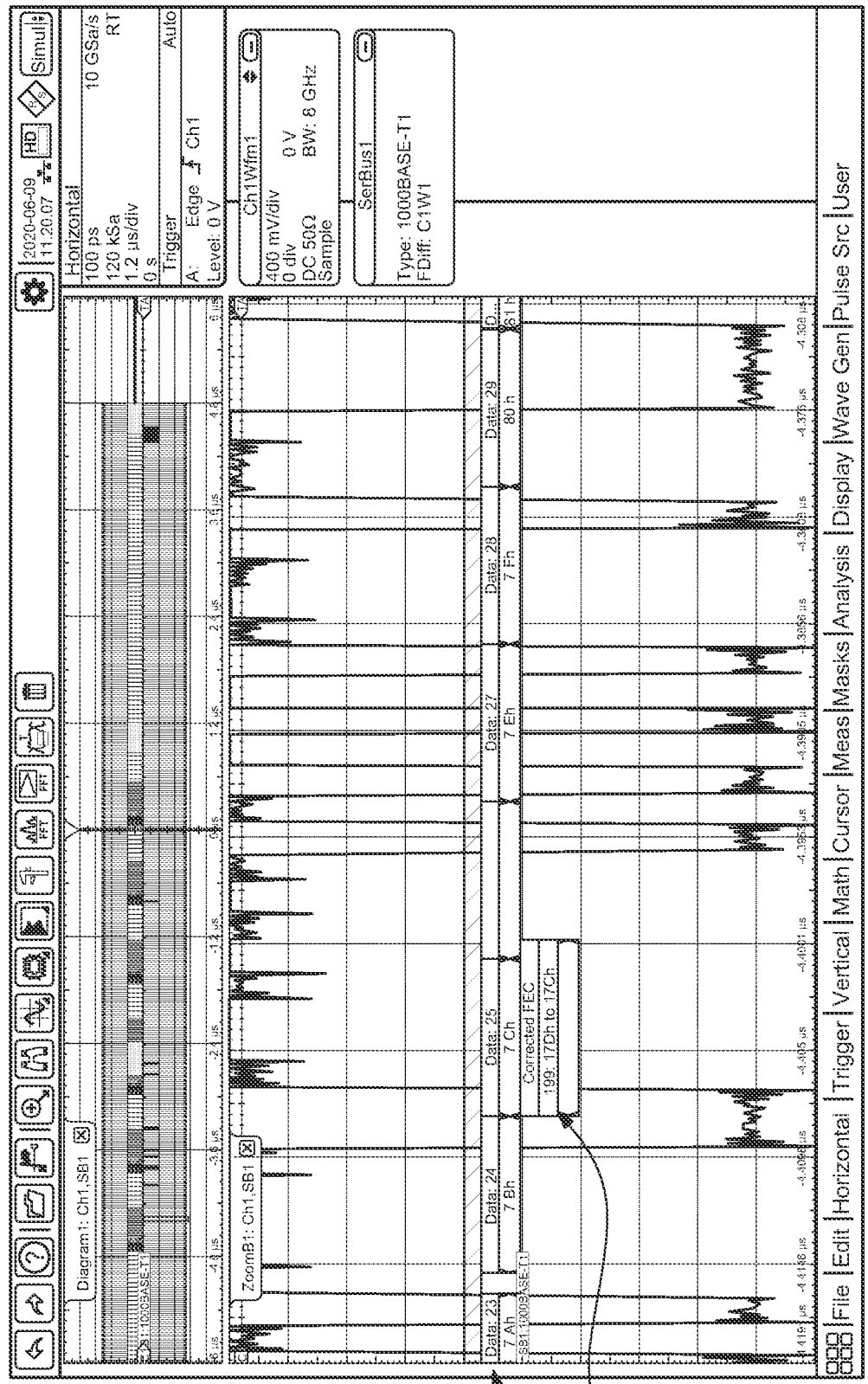
FIG. 3 shows a display of the signal analysis device of FIG. 1 displaying an exemplary data set.

The visualization data is displayed on the display 14 of the signal analysis device 10 (step S6). A first variant of the visualization data being displayed on the display 14 is illustrated in FIG. 3, which shows a plot of the input signal ("CH1Wfm1") over time. In the exemplary embodiment shown in FIG. 3, the visualization data comprises data labels 24 being associated with the decoded input signal and error labels 26 being associated with the at least one identified error.

The data labels 24 are established as rectangles having a predefined color. Moreover, the data labels each carry a text enumerating the individual data labels being associated with individual symbols of the symbol sequence.

However, it is to be understood that the data labels may have any other suitable form and/or color. Moreover, it is to be understood that information other than the number of the respective symbol may be displayed on the individual data labels 24.

The error labels 26 are established as rectangles having a predefined color, wherein the predefined color of the error labels 26 may be different from the predefined color of the data labels 24.

Moreover, the error labels 26 may carry a text stating that the associated symbols have been corrected ("Corrected FEC" in the example of FIG. 3). Moreover, the error labels 26 may carry a text stating the numbers of the symbols that have been corrected.

Figure 4:
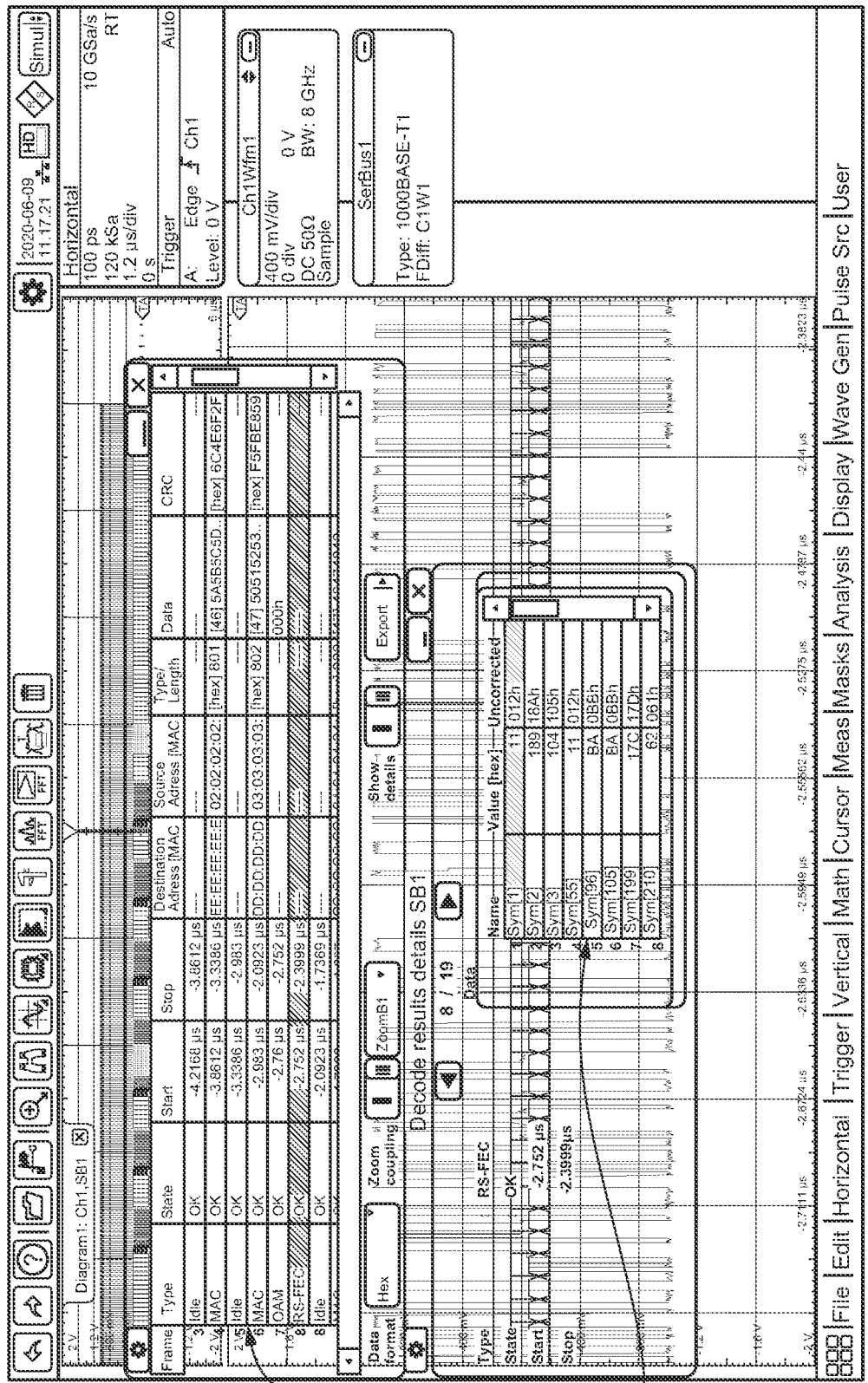
FIG. 4 shows a display of the signal analysis device of FIG. 1 displaying a further exemplary data set.

FIG. 4 also shows a plot of the input signal ("Ch1Wfm1") over time, but with another type of visualization data. In the exemplary embodiment of FIG. 4, the visualization data comprises a first table 28 and a second table 30.

Generally speaking, the individual cells of both tables 28, 30 comprise information being associated with the data set, i.e. information on the (decoded) input signal and/or information on the errors in the (decoded) input signal.

The first table 28 comprises information on a number of the respective symbol, the type of the respective symbol, whether the respective symbol comprises an error ("State"), a start time of the respective symbol ("Start"), a stop time of the respective symbol ("Stop"), a destination address of the respective symbol, a source address of the respective symbol, a length of the respective symbol, a symbol value of the respective symbol ("Data"), and a checksum being associated with the respective symbol ("CRC").

The second table 30 is established as a list of several corrected symbols of the symbol sequence, for example as a list of all corrected symbols of the symbol sequence. The second table 30 comprises the number of each of the corrected symbols ("Name"), the corrected value of the respective symbol ("Value") and the corresponding uncorrected value of the respective symbol ("Uncorrected"). Thus, the second table 30 provides a comparison of the faulty symbols with the corresponding corrected symbols.

The visualization data displayed on the display 14 provides relevant information needed for debugging a transmission path of the input signal to a user of the signal analysis device 10.

Two types of information, namely the information on the error itself and also information on the particular portion of the input signal or of the decoded input signal being associated with the error are displayed in a clear and intuitive way on the display 14.

In other words, the signal analysis device 10 described above provides information on the particular source of an error rather than only correcting the error itself, which is particularly useful for debugging the transmission path being associated with the input signal.

Figure 2:
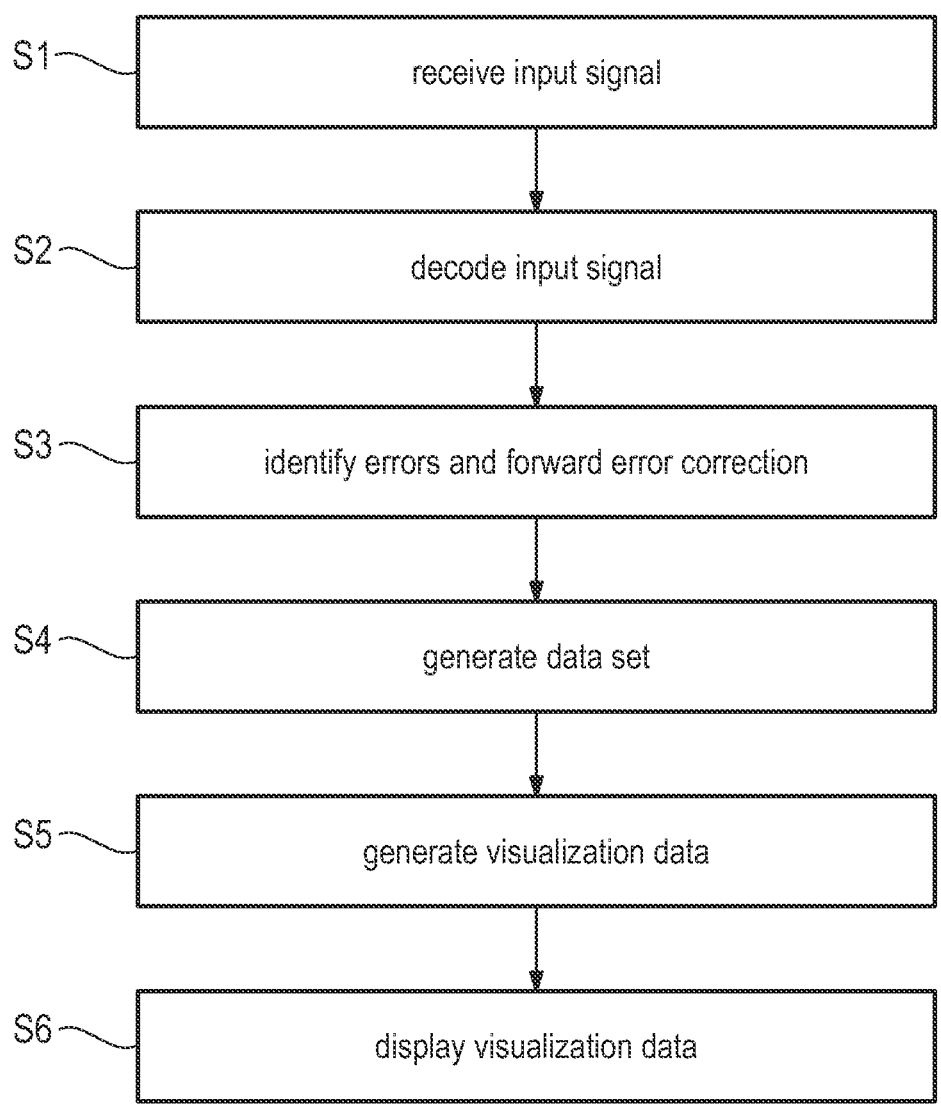
FIG. 2 shows a flow chart of a representative signal analysis method according to an embodiment of the present disclosure.

The signal analysis device 10, including such components as, for example, the signal analysis apparatus or module 12, the display 14, the decoder circuit or module 18, the error correction circuit or module 20, the processing circuit or module 22, etc., is configured to perform one or more steps schematically shown, for example, in FIG. 2. In some embodiments, one or more of these components includes one or more computer-readable media containing computer readable instructions embodied thereon that, when executed by one or more computer circuits (contained in or associated with the signal analysis device 10 or components thereof), cause the one or more computer circuits to perform one or more steps of the method of FIG. 2. In some embodiments, the one or more computer circuits includes a microprocessor, a microcontroller, a central processing unit, a graphics processing unit (GPU), a digital signal processor (DSP), an ASIC, etc.

In some embodiments, the one or more computer-readable media contains computer readable instructions embodied thereon that, when executed by the one or more computer circuits, sometimes referred to as computing devices, cause the one or more computer circuits to perform one or more steps of any of the method claims provided hereinafter.

As used herein, a computer-readable medium is any medium that stores instructions, codes, data, or other information non-transitorily and is directly or indirectly accessible to a computing device, such as a processor, etc. In other words, a computer-readable medium is a non-transitory memory at which one or more computing devices can access instructions, codes, data, or other information. As a non-limiting example, a computer-readable medium may include a volatile random access memory (RAM), a persistent data store such as a hard disk drive or a solid-state drive, or a combination thereof. In some embodiments, memory can be integrated with a processor, separate from a processor, or external to a computing system.

As was briefly described above, certain embodiments disclosed herein utilize circuitry (e.g., one or more circuits) in order to implement standards, protocols, methodologies or technologies disclosed herein, operably couple two or more components, generate information, process information, analyze information, store information, generate signals, encode/decode signals, convert signals, transmit and/or receive signals, control other devices, etc. Circuitry of any type can be used. It will be appreciated that the term "information" can be use synonymously with the term "signals" in this paragraph.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In some examples, the functionality described herein can be implemented by special purpose hardware-based computer systems or circuits, etc., or combinations of special purpose hardware and computer instructions.

Of course, in some embodiments, two or more of these components, or parts thereof, can be integrated or share hardware and/or software, circuitry, etc. In some embodiments, these components, or parts thereof, may be grouped in a single location or distributed over a wide area. In circumstances were the components are distributed, the components are accessible to each other via communication links.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A signal analysis apparatus for analyzing an input signal, the input signal comprising a symbol sequence, the symbol sequence comprising data information and redundant data information, the signal analysis apparatus comprising:
   a decoder circuit configured to decode the input signal, thereby obtaining a decoded input signal;
   an error correction circuit configured to identify at least one error in the decoded input signal, wherein the error correction circuit is configured to correct the at least one identified error based on the redundant data information, thereby obtaining a corrected decoded input signal, and
   a processing circuit configured to generate a data set, the data set comprising information on the at least one identified error and information on at least one of a portion of the input signal being associated with the at least one identified error and a portion of the decoded input signal being associated with the at least one identified error,
   wherein the information on the at least one identified error comprises a type of the at least one identified error, wherein the type of the at least one identified error relates to whether a symbol has been received with a false symbol value or whether the corresponding symbol has not been received at all,
   wherein the processing circuit is configured to generate visualization data based on the data set, wherein the visualization data comprises a table, wherein individual cells of the table comprise information being associated with the data set, wherein the table comprises a list of several or all corrected symbols of the symbol sequence, wherein the table comprises a number of each of the corrected symbols, corrected values of the respective symbols, and corresponding uncorrected values of the respective symbols.

2. The signal analysis apparatus of claim 1, wherein the information on the at least one identified error comprises a number of the identified errors.

3. The signal analysis apparatus of claim 1, wherein the data set comprises information on a portion of the corrected decoded input signal being associated with the error.

4. The signal analysis apparatus of claim 1, wherein the decoder circuit is established as a Reed Solomon decoder.

5. The signal analysis apparatus of claim 1, wherein the visualization data comprises at least one of a data label being associated with the decoded input signal and an error label being associated with the at least one identified error.

6. The signal analysis apparatus of claim 1, wherein the input signal is established as a pulse amplitude modulated (PAM)-N signal, wherein N is an integer greater than 1.

7. The signal analysis apparatus of claim 6, wherein the input signal is established as a PAM-3 signal.

8. A signal analysis device, comprising a display and a signal analysis apparatus according to claim 1.

9. A signal analysis method for analyzing an input signal comprising a symbol sequence, the symbol sequence comprising data information and redundant data information, the signal analysis method comprising:
   receiving the input signal;
   decoding the input signal by a decoder circuit, thereby obtaining a decoded input signal;
   identifying at least one error in the decoded input signal by an error correction circuit; and
   generating a data set by a processing circuit, the data set comprising information on the at least one identified error and information on at least one of a portion of the input signal being associated with the at least one identified error and a portion of the decoded input signal being associated with the at least one identified error, wherein the information on the at least one identified error comprises a type of the at least one identified error, wherein the type of the at least one identified error relates to whether a symbol has been received with a false symbol value or whether the corresponding symbol has not been received at all, wherein visualization data is generated based on the data set, wherein the visualization data is visualized on a display, wherein the visualization data comprises a plot of the input signal over time, wherein the visualization data comprises an error label being associated with the at least one identified error, wherein the error label is displayed within the plot of the input signal adjacent to a symbol that has been received with a false symbol value.

10. The signal analysis method of claim 9, wherein the information on the at least one identified error comprises a number of the identified errors.

11. The signal analysis method of claim 9, wherein the at least one identified error is corrected based on the redundant data information, thereby obtaining a corrected decoded input signal.

12. The signal analysis method of claim 11, wherein the data set comprises information on a portion of the corrected decoded input signal being associated with the error.

13. The signal analysis method of claim 11, wherein the at least one error is corrected based on a Reed Solomon error correction.

14. The signal analysis method of claim 9, wherein the visualization data comprises a data label being associated with the decoded input signal.

15. The signal analysis method of claim 9, wherein the visualization data comprises a table, wherein individual cells of the table comprise information being associated with the data set.

16. The signal analysis method of claim 9, wherein the input signal is established as a pulse amplitude modulated (PAM)-N signal, wherein N is an integer greater than 1.

* * * * *